United States Patent
Gupta

(10) Patent No.: US 10,866,938 B2
(45) Date of Patent: Dec. 15, 2020

(54) AUTOMATED RESHAPING AND RESTRUCTURING OF STORAGE STRUCTURES

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 1089 days.

(21) Appl. No.: 15/223,974

(22) Filed: Jul. 29, 2016

(65) Prior Publication Data

US 2018/0032550 A1 Feb. 1, 2018

(51) Int. Cl.
| G06F 16/00 | (2019.01) |
| G06F 16/21 | (2019.01) |
| G06F 21/78 | (2013.01) |
| G06F 16/22 | (2019.01) |
| G06F 21/72 | (2013.01) |
| G06F 21/62 | (2013.01) |

(52) U.S. Cl.
CPC .......... *G06F 16/212* (2019.01); *G06F 16/213* (2019.01); *G06F 16/2282* (2019.01); *G06F 21/6218* (2013.01); *G06F 21/72* (2013.01); *G06F 21/78* (2013.01)

(58) Field of Classification Search
CPC .................................................. G06F 16/212
USPC ....................................................... 707/803
See application file for complete search history.

(56) References Cited

U.S. PATENT DOCUMENTS

| 7,610,298 B2 * | 10/2009 | Zaytsev | G06F 16/213 |
| 2014/0143284 A1 * | 5/2014 | McCaffrey | G06F 16/213 |
| | | | 707/803 |
| 2015/0188890 A1 * | 7/2015 | Said | H04L 63/0428 |
| | | | 713/168 |
| 2016/0224802 A1 * | 8/2016 | Arnold | G06F 21/6245 |

OTHER PUBLICATIONS

U.S. Appl. No. 15/067,164, filed Mar. 10, 2016.
U.S. Appl. No. 15/147,143, filed May 5, 2016.

* cited by examiner

*Primary Examiner* — Chelcie L Daye
(74) *Attorney, Agent, or Firm* — Mintz Levin Cohn Ferris Glovsky and Popeo, P.C.

(57) ABSTRACT

In one aspect, systems and techniques for modifying a storage structure with newly encryptable fields is described. A delta encryption system loads a current database schema and an object model for a new database schema to a memory. The current database schema includes meta information identifying multiple fields and field information for a current application build. The object model includes meta information identifying multiple fields and field information for a new application build. The fields identified by the object model meta information include one or more encryptable fields. The delta encryption system calculates a field size information for the encryptable fields and compares the meta information from the current database schema with the meta information from the object model. In response to the comparison, the delta encryption system identifies which of the encryptable fields are newly encryptable fields and modifies a database based on the calculated field size information.

17 Claims, 3 Drawing Sheets

AUTOMATED RESHAPING AND RESTRUCTURING OF STORAGE STRUCTURES

TECHNICAL FIELD

This description relates to automated reshaping and restructuring of storage structures.

BACKGROUND

A database is one example of a storage structure that includes multiple fields, where the fields contain values or data. For security or other reasons, one or more of the fields may be encrypted such that the data in those fields are encrypted. Some databases use a multi-tenant architecture shared with a schema where one database serves multiple different users or customers such that the data for those users are stored in the one database even in a same shared table between different tenants.

SUMMARY

Systems and techniques, including computer program products, are provided for automated reshaping and restructuring of storage structures. In one example implementation, systems and techniques for modifying one type of storage structure, a database, with newly encryptable fields is described. A delta encryption system is capable of loading a current database schema for a current application build and an object model for a new database schema for a new application build to a memory. The current database schema includes meta information identifying multiple fields and field information for the current application build. The object model includes meta information identifying multiple fields and field information for the new application build and the fields identified by the object model meta information include one or more encryptable fields. The delta encryption system calculates a field size information for the encryptable fields and compares the meta information from the current database schema for the current application build with the meta information from the object model for the new database schema for the new application build. In response to the comparison, the delta encryption system identifies which of the encryptable fields are newly encryptable fields and modifies a database including changing a field size for the newly encryptable fields based on the calculated field size information.

The details of one or more implementations are set forth in the accompanying drawings and the description below. Other features will be apparent from the description and drawings, and from the claims.

DETAILED DESCRIPTION

Encrypting data in a database (e.g., a customer(s) data in a database), including in a database having a multi-tenant cloud architecture, brings a number of challenges. For example, one technical challenge is to identify which fields are marked newly to be encrypted from one application build to another application build, where the application builds each include configuration information for a database schema to be put in production in a database. Another technical challenge it to perform bulk encryption of historical data (e.g., historical data of the customer(s)). Still another technical challenge is the resource intensive process of performing the encryption/decryption.

Figure 1:
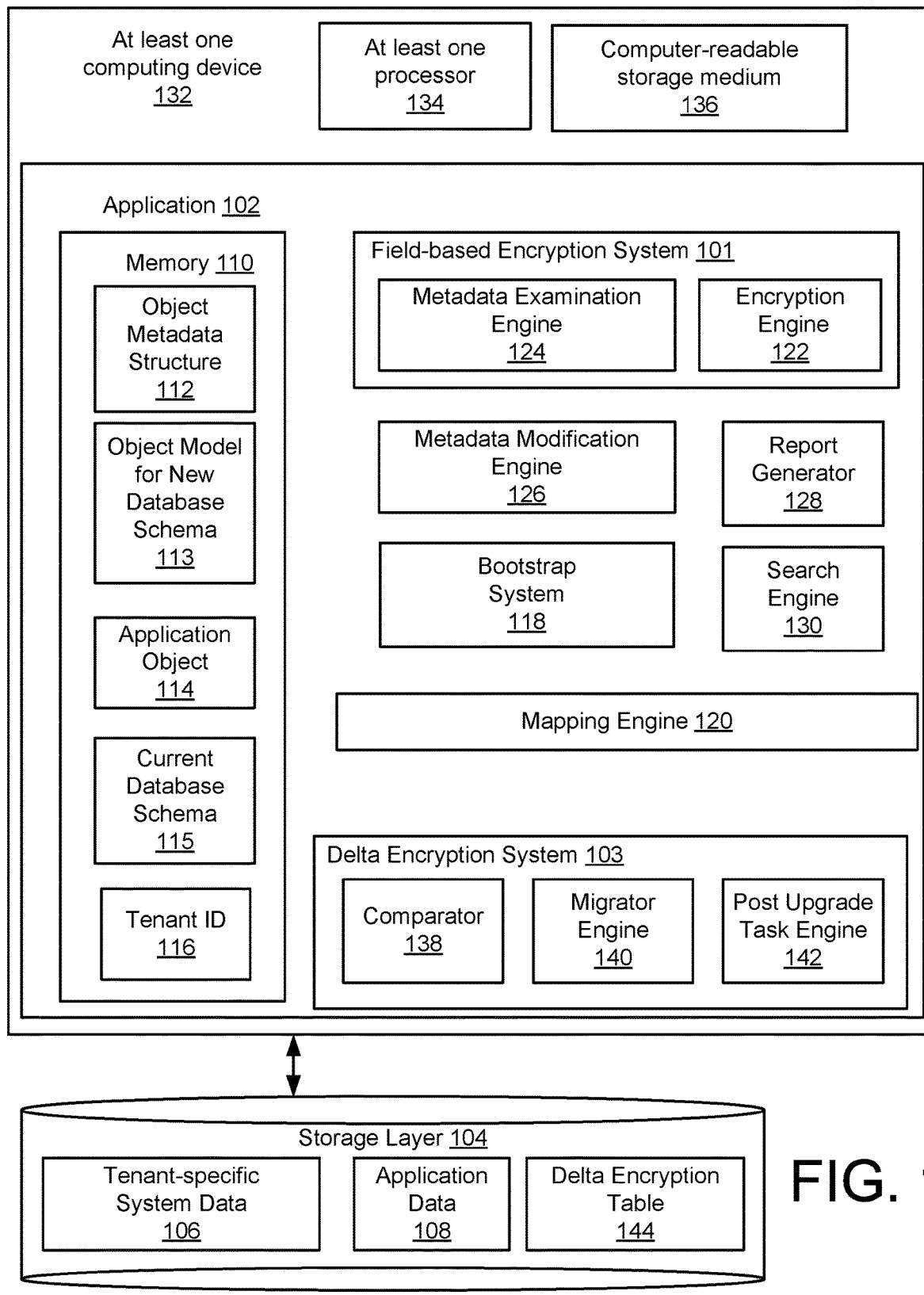
FIG. 1 is a block diagram of a system for modifying a database with newly encryptable fields.

Referring to FIG. 1, the system 100 includes an application 102 and a delta encryption system 103, which may be part of the application 102. This document describes systems and techniques to solve the technical challenges by using the system 100 including the application 102 components having the delta encryption system 103 to identify which fields in a new application build with a new database schema have been newly marked as encryptable, where the identifying is performed in an automated manner. In one example, an application may be used to develop a new application build for a new database schema to put in production on a database. The delta encryption system 103 identifies which fields in the new application build having a new database schema have been newly marked as encryptable when compared to the current application build having the current database schema. By identifying the fields newly marked as encryptable, the delta encryption system 103 is capable of realigning and modifying the database configuration, settings, database metadata, database shape, and other components, for example, at the time of the startup of the new application build.

Since encryption of data entails a number of steps, including identifying fields marked as encryptable, ensuring the storage structure in the database is big enough to store the encrypted data and so on, the delta encryption system 103 is capable of adjusting the storage structure in the database to accommodate newly encryptable fields. The newly encryptable fields include new fields that are added to the new application build and that are marked for encryption as well as existing fields in the current application build that are being changed from non-encryptable to encryptable. For fields that are being changed from non-encryptable to encryptable, the size of the field in the database needs to change to accommodate the extra field size needed for encryption. What is needed is an automated way for the system to identify which fields are newly marked as encryptable, for example, in the new application build as compared to the previous application build, which already may be in a production environment, and then to modify the database by reshaping and restructuring the database to accommodate changes between application builds.

As mentioned above, this document describes systems and techniques to identify newly marked encryptable fields and to configure the system in an automated way to encrypt these fields. This document may refer to the techniques as a delta encryption as performed by the delta encryption system 103 in cooperation with other components of the application 102 and a storage layer 104, which contains the database. Delta encryption even applies to the first time application build with a first time database schema that goes into production for a first time in the database. The delta from the application build in production to the new application build is all the fields marked as encryptable for the first time. This is especially useful for historical encryption where all the historical data for the customer also needs to be encrypted.

In one example, the technique may identify delta fields and initiate the bulk encryption operation work only on these additional fields. By identifying the newly encrypted fields and performing the bulk encryption operation only on these fields is a more efficient process and saves both computing resources and time. This document describes an efficient technique which allows to identify which fields are newly marked for encryption and re-configuring the system on the fly to adapt to these newly marked encryptable fields. In this manner, when changes are made to the application 102, for example in response to changing customer needs, the delta encryption system 103 enables the automatic remodeling and re-shaping of the database responsive to the changes made to the application 102. For instance, when changing customer needs dictate adding new fields that are encryptable or changing existing fields to be encryptable, the delta encryption system 103 adapts the database in an automated manner in response to the changes.

While the system and techniques described above and below are in the context of identifying newly encryptable builds between application builds, it is meant as a non-limiting example. The systems and techniques described herein may be applied and used in non-encryption contexts to identify field or other changes between application builds and to reconfigure, reshape and restructure the database in an automated manner responsive to changes between the different builds.

FIG. 1 is a block diagram of a system 100 for modifying a database with newly encryptable fields and for encryption of application data using field-level metadata. In the example of FIG. 1, a field-based encryption system 101 is configured to provide data encryption in a fast, resource-efficient manner. The field-based encryption system 101 is further configured to adapt quickly, e.g., in response to a situation in which a security breach may have occurred, or to scenarios in which users perform modifications to system data or a manner in which system data is stored. For example, the field-based encryption system 101 may be configured to encrypt new data (e.g., data within a new data field), or update the provided encryption using a new encryption algorithm, with little or no downtime of the system 100 as a whole.

In the example of FIG. 1, an object oriented software application 102 is illustrated and may be understood to represent one of many different types of object oriented software applications that exist today, or may be created in the future. Various specific examples of the object oriented software application 102 are provided below, or would be apparent to one of skill in the art. For example, applications may include enterprise resource management (ERM) systems, supply chain management (SCM) systems, or various other business applications related to management of customers' human resources or financial management.

In general, however, it will be appreciated for purposes of understanding operations of the system 100 of FIG. 1 that the object oriented software application 102 is constructed and executed in a manner that utilizes individual software objects to perform functionalities of the application 102. In this context, software objects, or objects, should be understood to refer to discrete, encapsulated software constructs that may correspond, for example, to individual, discrete entities, and which include, e.g., data that relates to that entity, as well as instructions or procedures for processing the included data. For example, with reference to the example applications just referenced, an object may refer to, or represent, a document (e.g., a sales order), a person, an inventory item, an account, or virtually any real-world, tangible or intangible entity that might be represented within, and processed by, the application 102.

Various potential advantages associated with such software objects in the context of the application 102, such as efficiencies in the development or maintenance of the application 102, or a speed or flexibility of the operations thereof, are generally well known, and are not described herein in detail, except as may be necessary or helpful in understanding operations of the system 100 of FIG. 1. Further in FIG. 1, and notwithstanding the various advantages just referenced with respect to use of object oriented programming techniques in the context of the application 102, it may be necessary or helpful to store data associated with use of the application 102 within a separate storage layer 104, which may include one or more database systems. For example, such separate data storage may be useful when the application 102 is not currently in use, or not in use by a particular user, or when a particular user of the application 102 requires only a subset of available data associated with the application 102 at a particular point in time.

Moreover, using the storage layer 104 for bulk storage of data may be more cost efficient, particularly when large quantities of data are required to be stored, accessed, maintained, shared between multiple systems, or otherwise utilized. In particular, such economies of scale, and other advantages, may be obtained in the context of implementing the application 102 and the storage layer 104 in a multi-tenant environment.

In other words, it is possible to provide use of the application 102, as well as storage of associated data, in the context of a service(s) provided to a plurality of customers/entities, referred to herein as tenants. For example, in scenarios in which the application 102 represents business software, then each such tenant may represent a particular business that pays fees associated with accessing and utilizing the system 100.

In the simplified example of FIG. 1, the storage layer 104 is illustrated as including tenant-specific system data 106, which generally represents all tenant-specific data associated with identifying, and otherwise managing, tenants having access to the system 100. For example, the tenant-specific system data 106 may identify individual tenants, as well as terms of use, quality of service agreements, authentication requirements, and any other data that may be useful in providing features and functions of the system 100 to individual tenants on a tenant-by-tenant basis. Of course, the storage layer 104 also may include various other types of system data associated with configuring, maintaining, and running the one or more database systems of the storage layer 104, although such system data is not necessarily described completely herein, for the sake of brevity and clarity.

The storage layer 104 is also illustrated as including application data 108. In this regard, it will be appreciated that the application data 108 refers generally to application-specific data that may be utilized to execute specific instances of the application 102 for individual tenants. In some implementations, a single tenant of the tenant-specific system data 106 may utilize two or more applications provided by a provider of the system 100, so that data is stored in the application data 108 in conjunction with its corresponding application for that tenant. In general, application data for multiple tenants and multiple applications may be stored together within the storage layer 104, including even within a single table of a single database.

In providing the application 102 and associated resources to the various tenants, the provider of the system 100 is typically required to maintain and ensure a desired type and extent of safety, integrity, security, and/or confidentiality of data belonging to each tenant that is stored within the application data 108. For example, as just referenced above, data that is private to a particular tenant may nonetheless be stored together within the storage layer 104 with private tenant-specific data of another tenant. Consequently, each tenant may be concerned that private data may be inadvertently or illicitly obtained by another tenant, by the provider of the system 100, or by any unauthorized party.

It is possible for the provider of the system 100 to provide a measure of data security through the use, e.g., of proper hardware and software provisioning and configuration, using various known techniques to maintain separation between, and limit access to, the various types of tenant-specific data. While these approaches may be sufficient in some cases, it may be necessary or desirable in other cases to provide encryption of private data, using one or more known encryption/decryption techniques.

In practice, however, existing encryption techniques may be expensive, time-consuming, and/or resource intensive, and, if not executed properly, may lead to various errors or malfunctions in operations of the system 100. For example, the computationally-intensive nature of many encryption techniques, combined with the potentially large quantity of data within the storage layer 104 and/or a potentially large number of tenants utilizing the system 100, may result in conventional encryption techniques being impractical or impossible to implement in an efficient or realistic manner, or in a manner that is acceptable to either the provider of the system 100 or the tenant requesting the encryption.

Moreover, it may be appreciated from the above description that some tenants may request encryption of some or all of their tenant-specific data, while other tenants may request no encryption and/or different types of encryption. Consequently, it may be difficult in existing systems even to determine whether and/or how particular data records are encrypted, such as when extensive lookup operations are required to successfully identify and execute suitable encryption procedures for particular data. Consequently, various difficulties may arise, such as when encrypted data is processed inadvertently as being non-encrypted (e.g., searching encrypted data inappropriately will lead to empty search results, even when the desired data is included and available). Further, of course, processing unencrypted data that was desired to be encrypted will lead to a lower level of security than that desired by the owner of the data in question.

Accordingly, the application 102 and the system 100 may be configured and implemented to provide encryption in a manner that is highly configurable and flexible, and that minimizes computational resources required. Moreover, as also described below, the encryption techniques implemented at the application 102 result in data being encrypted even during a time of transfer between the application 102 and the storage layer 104, thereby providing an additional layer and type of security for the encrypted data.

In more detail, as illustrated, the application 102 includes, and/or has access to, an application memory 110. As shown, the memory 110 may be utilized to store an object metadata structure 112 for an application object 114. As also illustrated in FIG. 1, the memory 110 may be utilized to store a tenant identifier (ID) 116 that identifies the tenant associated with the object metadata structure 112, the application object 114, and any related data, as obtained from the tenant-specific system data 106.

In general, the object metadata structure 112 may be understood to characterize techniques for constructing, processing, or otherwise utilizing the application object 114.

For example, as described in detail below with respect to the example object metadata structure 200 of FIG. 2, the object metadata structure 112 may define individual fields and associated attributes that may be included therein for the application object 114. As also described in detail below with respect to FIG. 2, all of the metadata related to the object-related fields, sometimes referred to herein as field meta, may be associated with a corresponding class of the object metadata structure 112, where metadata characterizing the class(es) of the application object 114 may be referred to as class meta.

In the highly simplified example of FIG. 1, for purposes of illustration and explanation, the object metadata structure 112 is illustrated as a single object metadata structure, associated with the single application object 114. In practice, the object metadata structure 112 may also be associated with a larger object model domain, in which a plurality of object metadata structures govern a corresponding plurality of objects, and in which the various object metadata structures (and associated objects) may inherit properties from, or otherwise be related to, other structures/objects.

The application 102 also includes, or is associated with, a bootstrap system 118 that is configured to perform various conventional boot operations associated with booting or loading the application 102. In example implementations, application instances of the application 102 may be shared among multiple tenants, and the bootstrap system 118 also may be configured to execute any tenant-specific bootstrap operations for a particular tenant mapped to a particular application instance.

Additionally, the bootstrap system 118 may be configured to facilitate the types of encryption operations referenced above, in conjunction with a loading of the object metadata structure 112, the application object 114, and the tenant ID 116 from the storage layer 104 into the memory 110. In particular, at a time of booting, the bootstrap system 118 may operate in conjunction with a mapping engine 120 to facilitate a loading of the object metadata structure 112, the application object 114, and the tenant ID 116 from the storage layer 104 into the memory 110.

For example, in specific implementations, as described in more detail below, the mapping engine 120 may represent an object to relational mapping (ORM) engine. Such mapping may be utilized when the storage layer 104 is a relational database, and therefore not directly compatible with the object-oriented data structures of the application 102. In other words, it may be more convenient, efficient, or cost-effective to store data of the storage layer 104 in a relational manner, even though it may be more practical, faster, or otherwise preferable to utilize object-oriented techniques with respect to execution of the application 102.

The application 102 further includes an encryption engine 122 that is configured to provide one or more types of data encryption, e.g., for data to be encrypted and sent to the storage layer 104. Further, the encryption engine 122 is configured to provide decryption of encrypted data, as such encrypted data is loaded from the storage layer 104, or otherwise processed. Consequently, it will be appreciated that the term "encryption" may be used herein in a general sense to include encryption and decryption operations and related operations, except when specific encryption or specific decryption operations are referenced or described separately.

In order to instruct the encryption engine 122 with respect to whether and how to encrypt/decrypt specific data in a manner that is efficient, practical, fast, and reliable, a metadata examination engine 124 is configured to analyze or examine the object metadata structure 112 and thereby determine which, if any, fields of the application object 114 should have included data encrypted/decrypted by the encryption engine 122.

In operation, the metadata examination engine 124 is configured to examine each individual field meta characterizing a corresponding field of the application object 114. In so doing, the metadata examination engine 124 may determine whether an individual field meta (and associated field) is identified as being encryptable. For example, if the object metadata structure 112 is constructed as a graph, as in the example of the graph illustrated and described below with respect to FIG. 2, then the metadata examination engine 124 may be configured to traverse the graph, identify each field meta, and determine whether each identified field meta is encryptable. In example implementations, a field may be marked as encryptable by its field meta in the sense that the system 100 is then provided with an ability to encrypt data within that field within a live instance of a corresponding object of a tenant, but will only actually do so in scenarios in which that tenant has opted-in and requested such encryption.

Techniques for marking an individual field meta of the object metadata structure 112 for encryption are described below. By way of example, however, an individual field meta of the object metadata structure 112 may be marked for encryption/decryption during an initial development of the application 102, and/or of a corresponding object model domain. Additionally, or alternatively, a metadata modification engine 126 may be provided that is configured to enable a runtime modification of the object metadata structure 112, including the marking of a particular field meta for encryption (or no encryption).

For example, in many scenarios, an initial or generic version of the application 102 and associated object model domain may be created by a provider of the system 100, and may be provided to a plurality of tenants. The various tenants, however, may have somewhat different desires or requirements with respect to operations of the application 102. It is a feature of the system 100 to provide runtime customization of the object metadata structure 112, to thereby provide individual tenants with the flexibility to modify operations of the application 102 in a desired manner. Accordingly, in conjunction with the various features and functions of the system 100 of FIG. 1 as described herein, the metadata modification engine 126 enables each tenant to specify, at a field level, a manner and extent to which data of that tenant will be encrypted.

Since, as described, encryption/decryption is executed within the encryption engine 122 within the application 102 itself, data may be encrypted, if desired, when stored within the storage layer 104, as well as during transfer between the storage layer 104 and the application 102 (e.g., when "in motion" between the storage layer 104 and the application 102), and may be decrypted only when, and to the extent, required for the processing in question.

For example, as already described above, it may be desirable to decrypt data when loading a live instance of the application object 114 into the memory 110. In other examples, the application 102 may include a report generator 128 that is configured to generate reports with respect to tenant-specific application data. Similarly, a search engine 130 may be configured to execute a search of tenant-specific application data of the application 102. Other types of data processing, such as various data updates or specific interactions with other applications, may be associated with, or require, decrypted data. In all such examples, it will be appreciated that the techniques of the system 100 of FIG. 1 provide for the types of flexible, efficient, fast, and reliable encryption/decryption techniques described herein.

In the example of FIG. 1, the application 102 is illustrated as being executed using at least one computer 132, which itself includes at least one processor 134 and a non-transitory computer readable storage medium 136. In other words, for example, the at least one computing device 132 may represent two or more computing devices in communication with one another, such as in a client/server architecture implemented over a computer network.

Somewhat similarly, the at least one processor 134 may represent two or more hardware processors operating in parallel. The non-transitory computer readable storage medium 136 may generally represent any suitable storage medium designed to store instructions which, when executed by the at least one processor 134, provides an executable version of the application 102.

Accordingly, it will be appreciated that the application 102 is illustrated as including the plurality of components/sub-components 110-142, but that, in various implementations, it may occur that one or more of these components/sub-components is implemented using two or more further sub-components. Similarly, but conversely, it will be appreciated that any two or more of the components/sub-components may be combined for execution as a single component. Even more generally, it will be appreciated that the system 100 of FIG. 1 is intended merely as a non-limiting example of various embodiments that may be provided using the various techniques, features, and functions described herein, and that additional or alternative variations may be implemented by one of skill in the art.

As discussed above, the application 102 further comprises a delta encryption system 103. The delta encryption system 103 includes a comparator 138, a migrator engine 140 (also referred to as a migrator) and a post upgrade task engine 142 (also referred to as a task engine). In response to the application 102 creating a new application build with a new database schema to deploy to the storage layer 104, the comparator 138 loads a current database schema 115 for the current application build (i.e., the current database schema and the current application build that is in production on the storage layer 104) to the memory 110. The current database schema 115 includes meta information that identifies multiple fields and field information for the current application build. The current database schema 115 may obtain some or all of the meta information related to the fields, including the field information, from the other components in memory 110 such as the object metadata structure 112, as described in detail above. The comparator 138 also loads an object model for a new database schema 113 for a new application build to the memory 110. The object mode for the new database schema 113 include meta information that identifies multiple fields and field information for the new application build. One or more of the fields for the new application build include new fields that are encryptable and may include one or more fields that exist in the current build non-encryptable fields but are now marked as encryptable. Similarly, the object mode for the new database schema 113 may obtain some or all of the meta information related to the fields, including the field information, from the other components in memory 110 such as the object metadata structure 112, as described in detail above.

The comparator 138 compares the meta information from the current database schema 115 for the current application build with the meta information from the object model for the new database schema 113 for the new application build.

In response to the comparison performed by the comparator 138, the migrator engine 140 identifies which of the encryptable fields are newly encryptable fields. In one implementation, a comparison of field size information may be used to identify which of the encryptable fields are newly encryptable fields.

More specifically, as part of the compare process, the comparator 138 compares the columns from the object model for the new database schema 113 with the columns from the current database schema 115. The comparator 138 also obtains the field size information from the current database schema 115 and calculates the field size information for the encryptable fields identified by the meta information from the object model for the new database schema 113. For one or more of the fields, the comparator 138 compares the field size information and, if there is a change in the field size such that the field size from the new database schema is larger, then the field is marked as a delta encryption field, meaning that changes need to be made to the database to accommodate the newly encryptable fields. The migrator engine 140 uses this information to identify which of the encryptable fields are newly encryptable fields. Other comparison techniques also may be used to determine which of the fields are newly encryptable fields.

As mentioned above, the comparator 138 calculates the field size information. The field size information may be calculated by identifying an encryption algorithm used to encrypt the encryptable fields from the object model meta information, identifying an encoding for storing the data in the encryptable field and calculating the field size information using the identified encryption algorithm and the identified encoding.

More specifically, as part of identifying encryption algorithm, the comparator 138, based on the encryption algorithm, identifies the prefix related to initialization vector (IV) that needs to be added. The comparator 138 also identifies the encoding required to store the data. If the data is a blob or attachment, then it can be stored in binary format as retrieved after standard encryption algorithms. However, when encrypting string data, which for example is stored in the database as one of the types in the varchar family, the data needs to be encoded with a character set, like Base 64, to allow it to be stored in the specific type in the database system. Essentially, the above process leads to an increase in the size of the database column length for storing the same number of characters in the database.

By way of example, assume the application 102 is using UTF-8 3 byte encoding to store string values to support various languages. For a metadata description of max length of 70 characters in the field, 210 bytes are allocated in the database by defining the column as Varchar2 (210). The formula for above would be defined as:

(Max Char length*Number of bytes as per encoding)=70*3=210 bytes

With encryption, and base 64 encoding this formula needs to change to augment the additional space needed for storing this data in the database. The modified formula with base 64 encoding is:

(Max Char length*Number of bytes as per encoding)*4/3

This formula works only for modes of encryption where there is no padding added to the encrypted data, like the CTR (or counter) mode of encryption. With modes like CBC (or cypher block chaining) where padding is added to the data, to map it to the block size, the formula is changed accordingly.

Also, most non-deterministic encryption algorithms end up prefixing the IV (initialization vector) to the encrypted data so that the data can be decrypted later on. The formula may be changed further to add the IV size as well. In the description, it is assumed that the application is using non-deterministic encryption with a fixed IV, hence no prefix of IV is required to the encrypted data. For the example in discussion, the storage size in the database comes out to be: (70*3)*(4/3)=280 bytes.

With this field size information, the comparison is made between the field of the new database schema and a corresponding field of the current database schema. The migrator engine 140 uses the information from the comparison to identify the field as a newly encryptable field is the field size in the new database schema is larger than the corresponding field of the current database schema.

The migrator engine 140 is capable of generating database commands to change the field size for the newly encryptable fields and applying the generated database commands to the database causing the field size to change for the newly encryptable fields. For example, the migrator engine 140 generates SQL statements to alter the size of the fields in the production database and then applies the SQL statements to the database.

In another way of describing this process, at the time of bootstrap of a node in the cluster by the bootstrap system 118, an application configuration utility called 'DatabaseProfile' may be defined, which loads the database metadata state for the tenant in this 'DatabaseProfile' object. This object allows to check the size of the field defined in the database, and compare it with the value based on the previously defined formulas based on the tags in the object's metadata. In this manner, the application creates entries in a SQL file with relevant system tables in the application to mark fields such identified as newly marked for encryption from the previous build already in production. The process doing this may be referred to as 'EnlargeStringColumnMigrator' as performed by the delta encryption system 103. One purpose of this migrator process is to generate alter SQL statements in a file to mark the columns newly discovered as encryptable in the new application build.

Before the build is loaded, this SQL is applied to the production database, by the migrator, and also these newly identified fields are added in a system table, which may be named DeltaEncryption 144, to mark the newly identified fields. Both this application of alter statements and marking fields in DeltaEncryption table 144 is done in a single transaction to avoid inconsistencies in the system.

Once the build is up a Post Upgrade task 142 is run to lookup these new entries in DeltaEncryption table 144, and for each such newly identified encryptable field other tables in the application like the bulk encryption checkpoint and other configurations are updated, indicating to these tasks that a new field has been marked as encryptable in the system and needs to processed accordingly, like for bulk encryption task, all the historical data for this field needs to be encrypted.

In a first use-case, a first application build with fields marked as encryptable are pushed to production. Assume there is an object with two fields marked as encryptable—a1, b1.

When the delta encryption system 103 runs its processes, such as the EnlargeStringColumnMigrator runs, the size the migrator engine 140 sees that the field values in the current database schema is 210, whereas the computed size for the field in the new database schema is 280, as determined by the comparator 138. That signifies there is a change in the fields to be encrypted in this object. The migrator engine 140 generates SQL statements that need to be applied to the production database before this build is brought up. Along with the SQL to change the size of the column, the migrator engine 140 will also generate a SQL to update another column in a marker table, such as delta encryption table 144.

After the build is brought up, a post upgrade task 142 will run and see this marker table and for all realms which have opted in for encryption the post upgrade task will update the tables which are used by other tasks like the bulk encryption task and reset the entries in these tables.

In a second use case, there is future build with more encryptable fields than the existing fields marked for encryption.

Assume an object with two fields marked as encryptable—a1, b1 is already in production. An additional field c1 is marked as encryptable in this new build. The same process as outlined above is followed using the comparator 138 and the migrator engine 140.

For field c1, the EnlargeStringColumnMigrator run by the delta encryption system 103 finds the size in DB is 210 while the size computed by the column migrator is 280, which is the size in database less than the computed size. This means this is a delta field to be encrypted. Same process as outlined above is followed, and the marker table is updated, so that the post upgrade task 142 can mark and reset the entries used by the bulk encryption task.

The delta encryption system 103 and its components may run the below example pseudocode to perform a delta encryption algorithm, which looks like the following:

```
Get Database Profile object <Contains details of all tables and columns
in DB>
Map<MetadataObject, DBTable> objectToDbMap = Create Map from
this Database Profile
List<Objects> from Metadata;
Iterate
   List<Fields> listOfFieldsInObject
   Iterate
      DbTable = Find the corresponding DB table for this object from
objectToDbMap
      List<Columns> dbTableColumnsList = DbTable.getFieldList ( )
      Iterate
         DbColumn = Find the column corresponding to field in
            DbTable from dbTableColumnsList
      End Iterate
      ColumnSizeFromDatabase = Get size of this column from the
DbColumn object
      FieldSize = Compute the expected size of the field based on
parameters and attributes defined in the metadata
         If (FieldSize < ColumnSizeFromDatabase)
         {
      Mark the field as Delta Encryption Field
      Generate Alter statements to update the size of this column in the
         database
      Also add insert sql statements to DeltaEncryption table which are
processed
         by the PostUpgrade task to configure other tables in the system
         }
            // Note: We do not do anything if the FieldSize >=
ColumnSizeFromDatabase
            // as we cannot reduce the size of the column which could lead to
truncation of
            // already stored data which could be encrypted as well.
         End Iterate
   End Iterate
// Apply Sql to production database
Apply the Alter statements to the Database to modify the size of the
   columns to accommodate the data size of these newly marked
encryptable fields
// PostUpgrade Task
For Each Unprocessed entry in Delta Encryption table
Iterate
```

-continued

```
-Update the tasks responsible for working on this newly identified
encryptable field
   Like Bulk encryption task
   -Mark the entry as Processed
End Iterate
```

Figure 3:
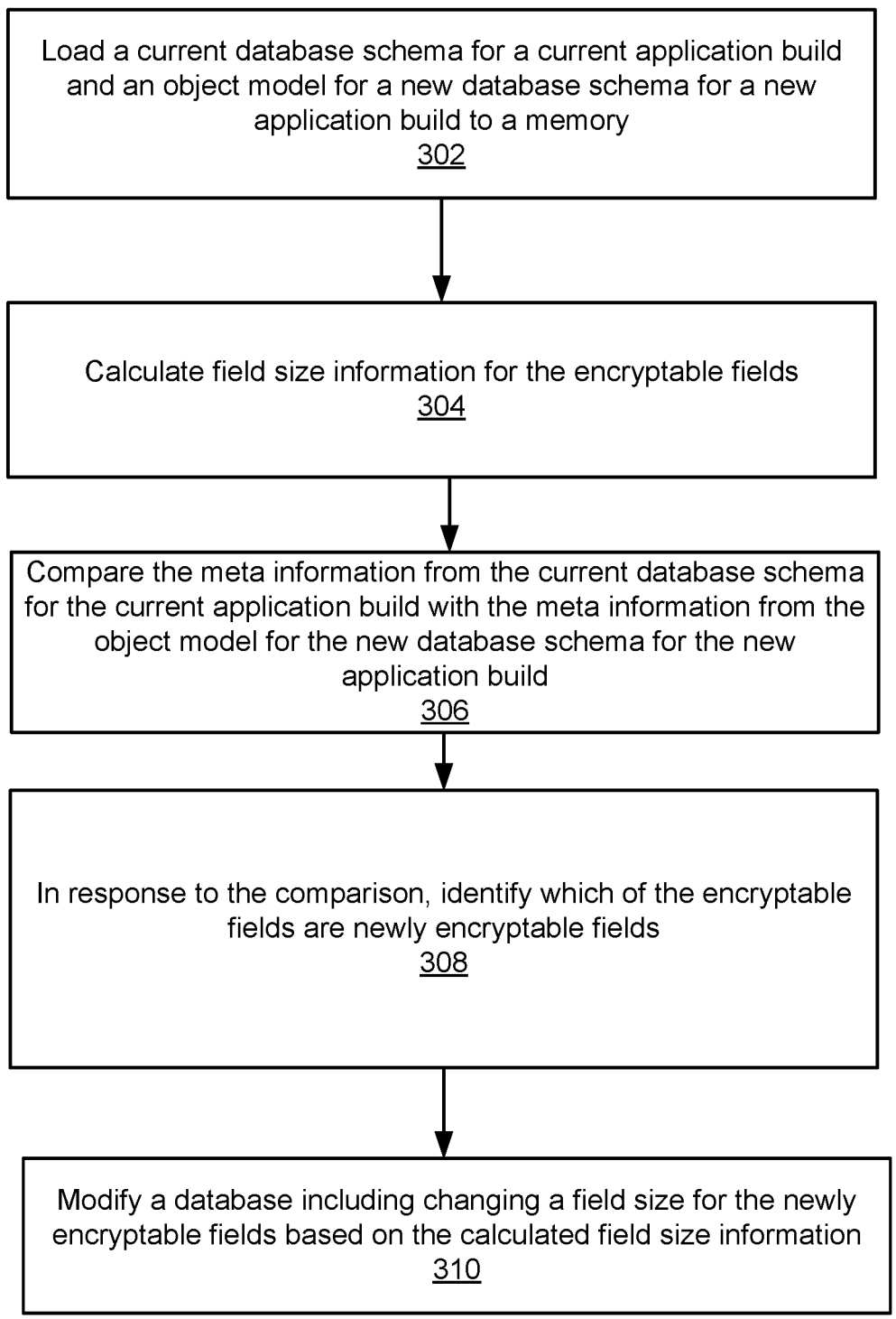
FIG. 3 is a flowchart illustrating example operations of the system of FIG. 1.

Referring to FIG. 3, an example process 300 illustrates example operations of the system 100 of FIG. 1. Process 300 includes loading a current database schema for a current application build and an object model for a new database schema for a new application build to a memory (302). The current database schema includes meta information identifying multiple fields and field information for the current application build and the object model comprises meta information identifying multiple fields and field information for the new application build and the fields identified by the object model meta information comprise one or more encryptable fields. For example, the comparator 138 is capable of loading a current database schema for a current application build and an object model for a new database schema for a new application build to a memory.

Process 300 includes calculating field size information for the encryptable fields (304). For example, the comparator 138 is capable of calculating field size information for the encryptable fields. Process 300 includes comparing the meta information from the current database schema for the current application build with the meta information from the object model for the new database schema for the new application build (306). For example, the comparator 138 is capable of comparing the meta information from the current database schema for the current application build with the meta information from the object model for the new database schema for the new application build.

Process 300 includes in response to the comparison, identifying which of the encryptable fields are newly encryptable fields (308) and modifying a database including changing a field size for the newly encryptable fields based on the calculated field size information (310). For example, the migrator 140 is capable of identifying which of the encryptable fields are newly encryptable fields and modifying a database including changing a field size for the newly encryptable fields based on the calculated field size information.

Referring back to FIG. 2, a block diagram illustrates an association 200 between an object and its metadata. As illustrated, an object (or a class) 202 may include a plurality of fields 204, 206, 208. Each field may be associated with one or more attributes. As shown, the field 204 is associated with attributes 210, 212, and the field 208 is illustrated as being associated with attributes 214, 216. The fields 204, 206, 208 may be classified as a primitive type (e.g., integer), or a complex type (e.g., another class or object). An attribute may have defined potential or available values, such as true/false, or a range of numerical values.

Figure 2:
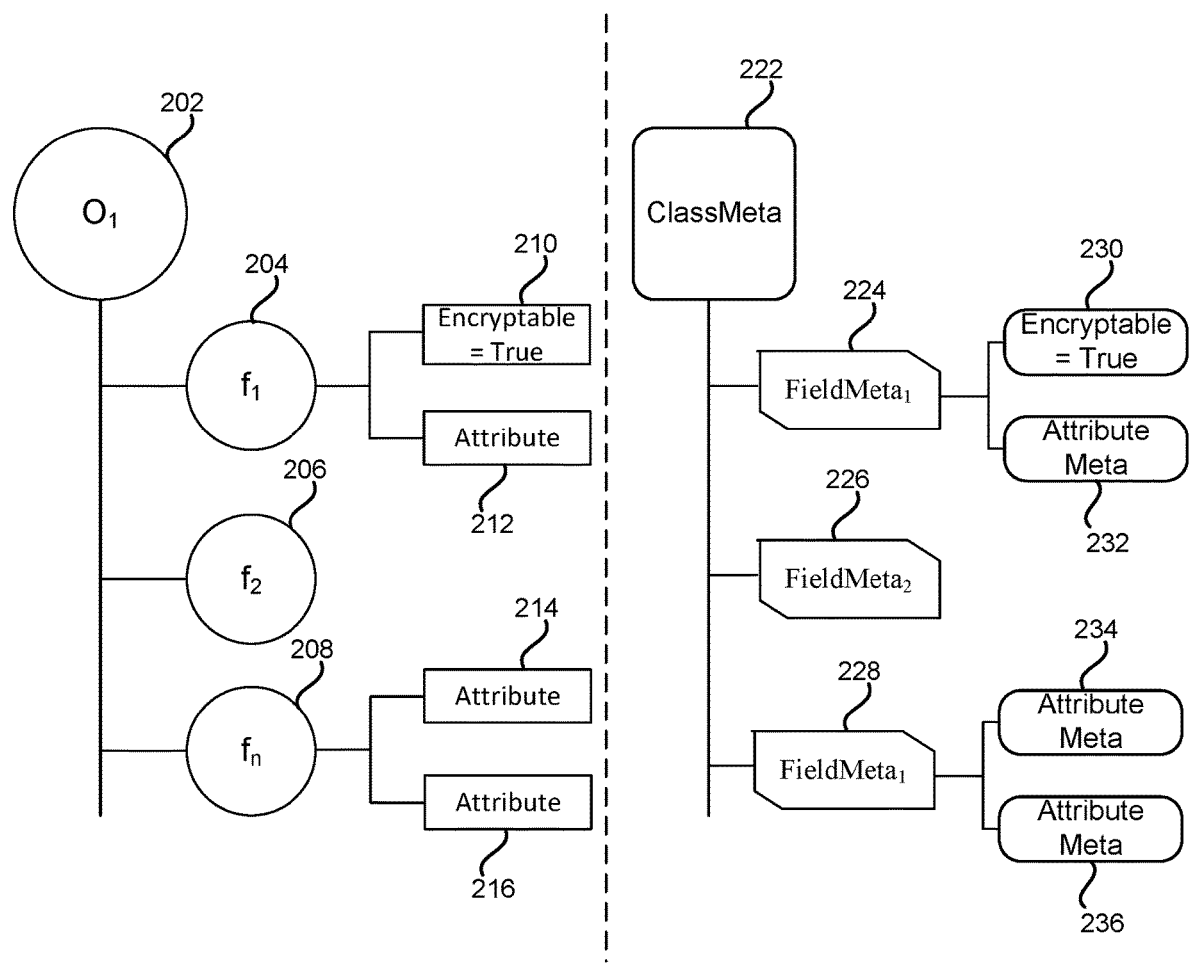
FIG. 2 is a block diagram illustrating an association between an object and its metadata.

Meanwhile, object metadata may include metadata 222 for the object (or the class) 202, and is illustrated in the example of FIG. 2 as ClassMeta222. As shown, the ClassMeta222 may include a FieldMeta 224, FieldMeta 226, and FieldMeta 228. As may be observed, the FieldMetadata 224, 226, 228 correspond directly to the fields 204, 206, 208, respectively, of the object 202. Further, and similarly, each FieldMeta may be associated with corresponding attribute metadata. For example, as shown, the FieldMeta 224 is shown as being associated with attribute metadata 230, 232 (corresponding to attributes 210, 212, respectively of the object 202), while the FieldMeta 228 is illustrated as being associated with attribute metadata 234, 236 (corresponding to attributes 214, 216, respectively) and may include field size information.

With reference to FIG. 1, it will be appreciated that FIG. 2 illustrates an example of the object (or class) 114, illustrated as the object 202, as well as an example of the object metadata structure 112 (illustrated as ClassMeta222). In the example of FIG. 2, the ClassMeta222 of the metadata structure provides a metadata graph of an object model, which, as referenced above and described in detail below, may be traversed to determine characteristics thereof. For example, the metadata examination engine 124 of FIG. 1 may be configured to access the object metadata structure 112 for the application object 114 within the memory 110, as part of efforts related to encrypting or decrypting data of the application object 114.

As also referenced above, at a time of system bootstrap using the bootstrap system 118, objects/classes (e.g., base classes, as well as tenant-customized classes that may have been specified using the metadata modification engine 126) may be loaded. Then, metadata graphs, such as the runtime object metadata structure 112, may be constructed in conjunction with the loading of the classes/objects. If necessary, or desired, the constructed metadata graph may be traversed to determine whether, how, and to what extent the data of the application object 114 should be encrypted/decrypted.

In addition to bootstrap-related operations, a similar traversal of the object metadata structure 112 may occur at other times of operations of the system 100. For example, when a tenant modifies or customizes a class at system runtime, using the metadata modification engine 126, the metadata examination engine 124 may proceed to traverse the graph of the object metadata structure 112, and determine any changes that may have been made with respect to requirements for encrypting individual fields of the application object 114.

In particular, as referenced above and described in detail below, the system 100 enables field-specific designations of encryption requirements. For example, as shown in FIG. 2, the FieldMeta 224 may have AttributeMeta 230 indicating that the field 204 is designated as encryptable. Then, as also illustrated, the attribute 210 may have a value set to "encryptable=true."

For example, the metadata examination engine 124 may be configured to define a hash table specifying computations to be performed to decide whether a class/object has encryption requirements. For example, such rules may be written as expressions based on the class meta, FieldMeta, and attribute meta structures, so that these expressions may be evaluated, for example, during a time that the metadata structure 112 is loaded. For example, in the simplified example of FIG. 2, the metadata examination engine 124 may thus determine that encryption is required for a particular field if, for example, a field type of the field is "string," and an associated field attribute for encryption is marked as "true." Rules and expressions of the metadata examination engine 124 may be extensible and modifiable, as needed.

In some example implementations, the metadata modification engine 126, enables customization of object models by individual tenants, in order to suit individual needs of those tenants. For example, it may occur that the object 202 is shared by multiple tenants, and an initial version of the object 202 is thus the same for all of the tenants. However, after a customization by a particular tenant, another version of the object 202 may include a new field, or a new attribute for an existing field. As described, such modifications may occur during runtime of the system 100.

In practice, each such change may be applied to the metadata version of the objects in question for the particular tenant. When the object metadata structure 112 is modified in memory for the memory 110, the metadata modification engine 126 may automatically cause the metadata examination engine 124 to re-examine the object metadata structure 112 to determine whether encryption requirements have been changed.

Thus, the application object 114 stores classes or objects that are loaded, e.g., automatically during operations of the bootstrap system 118. In other scenarios, classes or objects may be loaded when queries for the classes or objects are received during system runtime. The runtime object metadata structure 112 stores metadata of classes/objects when the classes/objects are loaded into the application object 114. Consequently, it is straightforward for the metadata examination engine 124 to examine the object metadata structure 112 and determine whether and how individual fields of the application object 114 should be encrypted/decrypted.

FIGS. 1 and 2 illustrate and describe example techniques for metadata-driven identification and encryption of data fields at an application layer of a multi-tenant cloud architecture, thereby allowing encryption capabilities in the cloud. Described techniques facilitate the resource-intensive process of encrypting customer data in such a multi-tenant environment, including effectively reducing the amount of computing resources and time required to execute encryption techniques, even when changing requirements and sensitivity of newly added data lead to requests for additional fields to be added and encrypted within an existing object model.

In particular, the techniques of FIGS. 1 and 2 provide an approach for identifying fields in the object model that will require encryption, to perform encryption on the identified fields on the fly within the system 100. Moreover, as described herein, such encryption may be performed at the application layer, without requiring modifications of any object relational mapping requirements that may be in place, thereby ensuring that data is encrypted even during transportation thereof between the application layer and a separate storage layer. As may be appreciated, such a metadata-driven approach leads to an efficient data model, as well as the storing of configurations of encryptable fields in the metadata defining the structure of the field within the object model.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for modifying a database with including one or more newly encryptable fields, the method comprising:
loading, to a memory, a current database schema for a current application build and an object model for a new database schema for a new application build to a memory, the object model for the new database schema loaded based on a tenant identifier identifying a tenant from among a plurality of tenants served by the database, wherein:
the current database schema comprises meta information identifying multiple fields and field information for the current application build, and
the object model comprises object model meta information identifying multiple fields and field information for the new application build, the fields identified by the object model meta information comprise one or more encryptable fields;
calculating field size information for the one or more encryptable fields, the field size calculated by identifying, based on the object model meta information corresponding to the tenant identifier, an encryption algorithm used to encrypt the one or more encryptable fields, identifying an encoding for storing data in the one or more encryptable fields, and calculating the field size information using the identified encryption algorithm and the identified encoding;
comparing the meta information from the current database schema for the current application build with the object model meta information from the object model for the new database schema for the new application build to determine, for each of the one or more encryptable fields, whether a field size has changed;
in response to the comparing indicating the field size has changed identifying, from the one or more encryptable fields, the one or more newly encryptable fields; and
modifying, in response to the identifying the one or more are newly encryptable fields, the database by at least changing, for the one or more newly encryptable fields, a corresponding field size, the changing based on the calculated field size information.

2. The method as in claim 1, wherein modifying the database comprises updating a table schema and structures in the database.

3. The method as in claim 2, wherein modifying the database comprises:
generating database commands to change the field size for the one or more newly encryptable fields; and
applying the generated database commands to the database causing the field size to change for the one or more newly encryptable fields.

4. The method as in claim 3, wherein updating the table schema and structures and applying the generated database commands to the database are performed as part of a single transaction.

5. The method as in claim 1, further comprising performing a bulk encryption only for historical data stored in the one or more newly encryptable fields.

6. The method as claim 1, further comprising automatically re-configuring and re-shaping the database based on the one or more newly encryptable fields.

7. A system for modifying a database with including one or more newly encryptable fields, the system comprising:
at least one processor and at least one memory including instructions, which when executed by the at least one processor provide at least on a computing device; and
at least one processor on the computing device, wherein the processor is operably coupled to the at least one memory and is arranged and configured to execute the instructions that, when executed, cause the processor to implement:
a comparator that is capable of configured to at least:
loading, to the at least one memory, a current database schema for a current application build and an object model for a new database schema for a new application build to the memory, the object model for the new database schema loaded based on a tenant identifier identifying a tenant from among a plurality of tenants served by the database, wherein:

the current database schema comprises meta information identifying multiple fields and field information for the current application build, and the object model comprises object model meta information identifying multiple fields and field information for the new application build, the fields identified by the object model meta information comprise one or more encryptable fields, calculating field size information for the one or more encryptable fields, the field size calculated by identifying, based on the object model meta information corresponding to the tenant identifier, an encryption algorithm used to encrypt the one or more encryptable fields, identifying an encoding for storing data in the one or more encryptable fields, and calculating the field size information using the identified encryption algorithm and the identified encoding, and comparing the meta information from the current database schema for the current application build with the object model meta information from the object model for the new database schema for the new application build to determine, for each of the one or more encryptable fields, whether a field size has changed; and a migrator that is capable of configured to at least:
in response to the comparing indicating the field size has changed, identifying, from which of the one or more encryptable fields, the one or more are newly encryptable fields, and modifying, in response to the identifying the one or more are newly encryptable fields, the database by at least changing for the one or more newly encryptable fields, a corresponding field size, the changing based on the calculated field size information.

8. The system of claim 7, wherein the migrator modifies the database by at least updating a table schema and structures in the database.

9. The system of claim 8, wherein the migrator modifies the database by at least:
generating database commands to change the field size for the one or more newly encryptable fields; and
applying the generated database commands to the database causing the field size to change for the one or more newly encryptable fields.

10. The system of claim 9, wherein the migrator uses a single transaction to at least update the table schema and structures and apply the generated database commands to the database.

11. The system of claim 7, further comprising an encryption engine that is capable of performing a bulk encryption only for historical data stored in the one or more newly encryptable fields.

12. The system of claim 7, further comprising a post upgrade task engine that is capable of automatically re-configuring and re-shaping the database based on the one or more newly encryptable fields.

13. A computer program product for modifying a database with including one or more newly encryptable fields, the computer program product being tangibly embodied on a non-transitory computer-readable storage medium and comprising instructions that, when executed are configured to cause the at least one computing device to at least:

load, to a memory, a current database schema for a current application build and an object model for a new database schema for a new application build to a memory, the object model for the new database schema loaded based on a tenant identifier identifying a tenant from among a plurality of tenants served by the database, wherein:

the current database schema comprises meta information identifying multiple fields and field information for the current application build, and the object model comprises object model meta information identifying multiple fields and field information for the new application build, the fields identified by the object model meta information comprise one or more encryptable fields;

calculate field size information for the one or more encryptable fields, the field size calculated by identifying, based on the object model meta information corresponding to the tenant identifier, an encryption algorithm used to encrypt the one or more encryptable fields, identifying an encoding for storing data in the one or more encryptable fields, and calculating the field size information using the identified encryption algorithm and the identified encoding;

compare the meta information from the current database schema for the current application build with the object model meta information from the object model for the new database schema for the new application build to determine, for each of the one or more encryptable fields, whether a field size has changed;

in response to the comparing indicating the field size has changed identifying, from the one or more encryptable fields, the one or more newly encryptable fields; and modifying, in response to the identifying the one or more are newly encryptable fields, the database by at least changing for the one or more newly encryptable fields, a corresponding field size, the changing based on the calculated field size information.

14. The computer program product of claim 13 further comprising instructions, that when executed, cause the computing device to at least modify a database including changing a field size for the one or more newly encryptable fields based on the calculated field size information.

15. The computer program product of claim 14, wherein the instructions that, when executed, cause the computing device to modify the database comprise instructions that, when executed, cause the computing device to at least:
generate database commands to change the field size for the one or more newly encryptable fields; and
apply the generated database commands to the database causing the field size to change for the one or more newly encryptable fields.

16. The computer program product of claim 14, further comprising instructions that, when executed, cause the computing device to perform a bulk encryption only for historical data stored in the one or more newly encryptable fields.

17. The computer program product of claim 14, further comprising instructions that, when executed, cause the computing device to automatically reconfigure and re-shape the database based on the one or more newly encryptable fields.

* * * * *